United States Patent [19]

Yamada

[11] Patent Number: 5,610,914
[45] Date of Patent: Mar. 11, 1997

[54] SHARED BUFFER MEMORY SWITCH FOR AN ATM SWITCHING SYSTEM AND ITS BROADCASTING CONTROL METHOD

[75] Inventor: Kenji Yamada, Tokyo, Japan

[73] Assignee: NEC Corporation, Tokyo, Japan

[21] Appl. No.: 449,706

[22] Filed: May 24, 1995

[30] Foreign Application Priority Data

May 24, 1994 [JP] Japan ................................. 6-132468

[51] Int. Cl.$^6$ ............................. H04L 12/56; H04L 12/50
[52] U.S. Cl. ......................... 370/395; 370/413; 370/535
[58] Field of Search ............................ 370/60.1, 60, 61, 370/94.1, 94.2, 58.1, 58.2, 58.3, 85.3; 365/200

[56] References Cited

U.S. PATENT DOCUMENTS

| | | | |
|---|---|---|---|
| 4,947,388 | 8/1990 | Kuwahara et al. | 370/60 |
| 5,280,475 | 1/1994 | Yanagi et al. | 370/60 |
| 5,394,397 | 2/1995 | Yanagi et al. | 370/60.1 |
| 5,410,540 | 4/1995 | Aiki et al. | 370/60 |

OTHER PUBLICATIONS

"Large-Scale ATM Multistage Switching Network with Shared Buffer Memory Switches," Y. Sakurai, N. Ido, S.Gohara, and N.Endo, IEEE Communications Magazine, pp. 90–96, Jan. 1991.

"A Shared Buffer Memory Switch for an ATM Exchange," N. Endo, H. Kuwahara, M. Ogino, and T. Kozaki, IEEE Communications, Int'l Conference, pp. 4.4.1–4.4.5, 1989.

*Primary Examiner*—Wellington Chin
*Assistant Examiner*—Melissa Kay Carman
*Attorney, Agent, or Firm*—Young & Thompson

[57] ABSTRACT

A shared buffer memory switch for an ATM switching system and its broadcasting control method are provided which can guarantee the cell transfer quality defined for each connection by maintaining the sequence order of arrival for each cell even if ordinary and broadcasting cells are mixed. When an input cell is a broadcasting cell, bit map data showing a broadcasting destination information is read from a broadcast registration table 6 based on the routing information derived from a header information of the cell, and an address for storing the cell in the shared buffer memory 3 is written in all the address pointer queues of FIFOs 9- corresponding to all output ports shown in the broadcasting destination information, and the cell is stored in the shared buffer memory 3 with the broadcasting destination information. In reading a cell, an address of the shared buffer memory from which the cell is to be read out is read from the address pointer queue of FIFO 9-, and the cell is output to the corresponding output port. In the case where the cell is a broadcasting cell, the broadcasting destination information attached to the cell is reset for the corresponding output port and the revised broadcasting destination information and the cell is stored in the same address of the shared buffer memory until all broadcasting destination information are reset.

5 Claims, 11 Drawing Sheets

VPI: Virtual Path Identifier
VCI: Virtual Channel Identifier

SHARED BUFFER MEMORY SWITCH FOR AN ATM SWITCHING SYSTEM AND ITS BROADCASTING CONTROL METHOD

BACKGROUND OF THE INVENTION

1. Field of the Invention

The present invention relates to a shared buffer memory switch for an ATM (Asynchronous Transfer Mode) switching system and its broadcasting control method, and, more particularly, to a shared buffer memory switch which can output ordinary cells and broadcasting cells in the order of their arrival without providing a specific address pointer queue for a broadcasting control and its broadcasting control method.

2. Description of the Related Art

Figure 1:
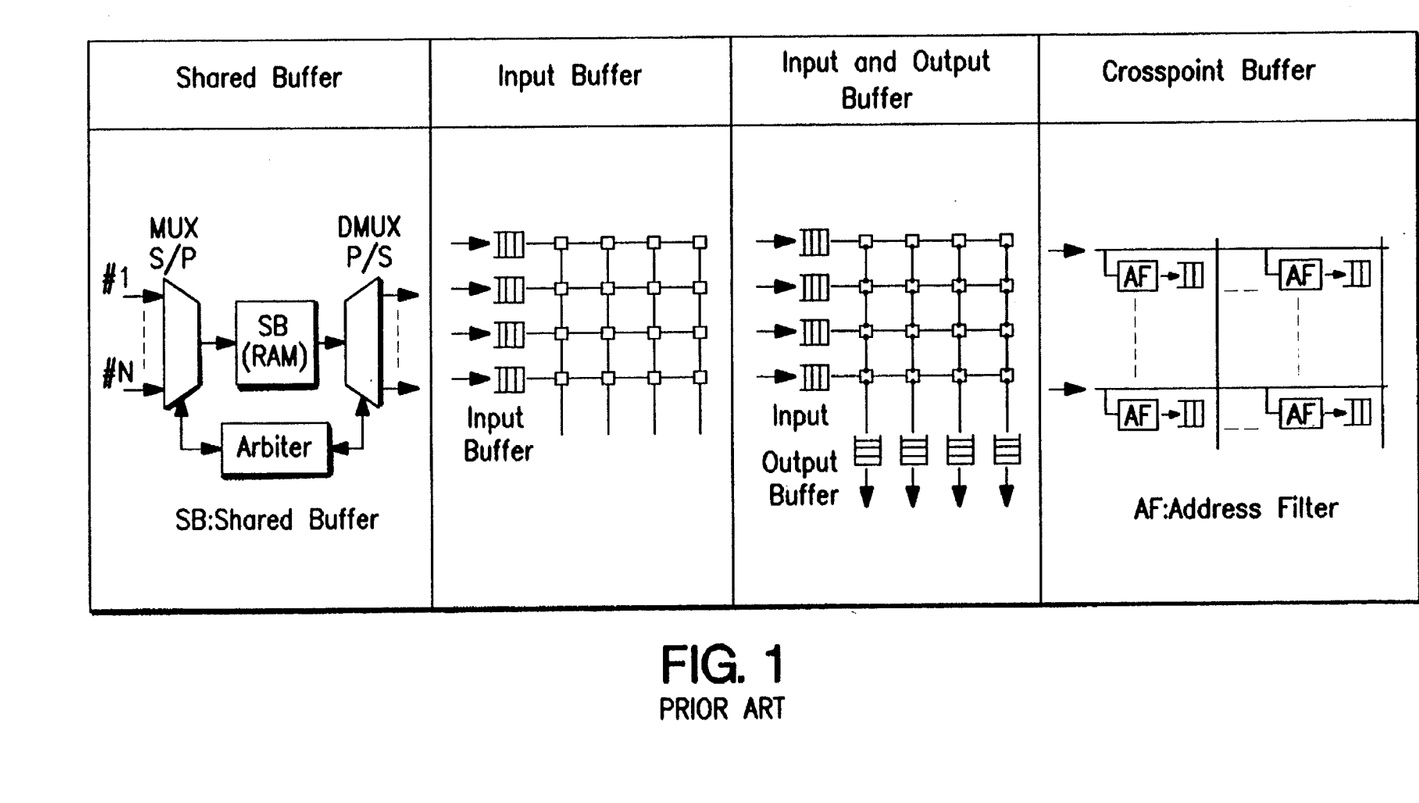
FIG. 1 is a schematic block diagram illustrating an architecture of four types of switches used in the ATM switching system.

Buffer memories are generally used for a switch of the ATM switching system. This is mainly for the purpose of avoiding a collision of cells (each cell forms a packet of information of fixed length) in the switch in which cells to be switched are flowing. There are several switch architectures for the ATM switching system, and they are categorized as the following four types of switches in the view point of the location of buffer memories being provided in the switch, and each of architecture is shown in FIG. 1.

The first type of switch is a shared buffer memory switch, which has a buffer memory commonly used for all input traffic (the flow of cells coming into the switch through input ports) to be routed to any output port. The second type of switch is an input buffer memory switch, which has an input buffer memory provided at each of input ports of the switching matrix for adjusting an output of each cell into an output highway of the switch to avoid a collision of cells in the highway. The third type of switch is an input and output buffer switch, which has an input buffer memory and an output buffer memory being provided at each of input ports and output ports of the switch respectively, and the transmission speed of cells in the switch is accelerated for avoiding a collision of cells. The fourth type of switch is a crosspoint buffer switch, which has a buffer memory provided at each of the crosspoints of the switching matrix.

Among those four types of switch, the shared buffer memory switch is explained below by referring to FIG. 2 which illustrates a block diagram showing an N×N (a number of input ports and output ports is N respectively) shared buffer memory switch, and other related drawings of FIGS. 3, 4, 5 and 6.

Figure 2:
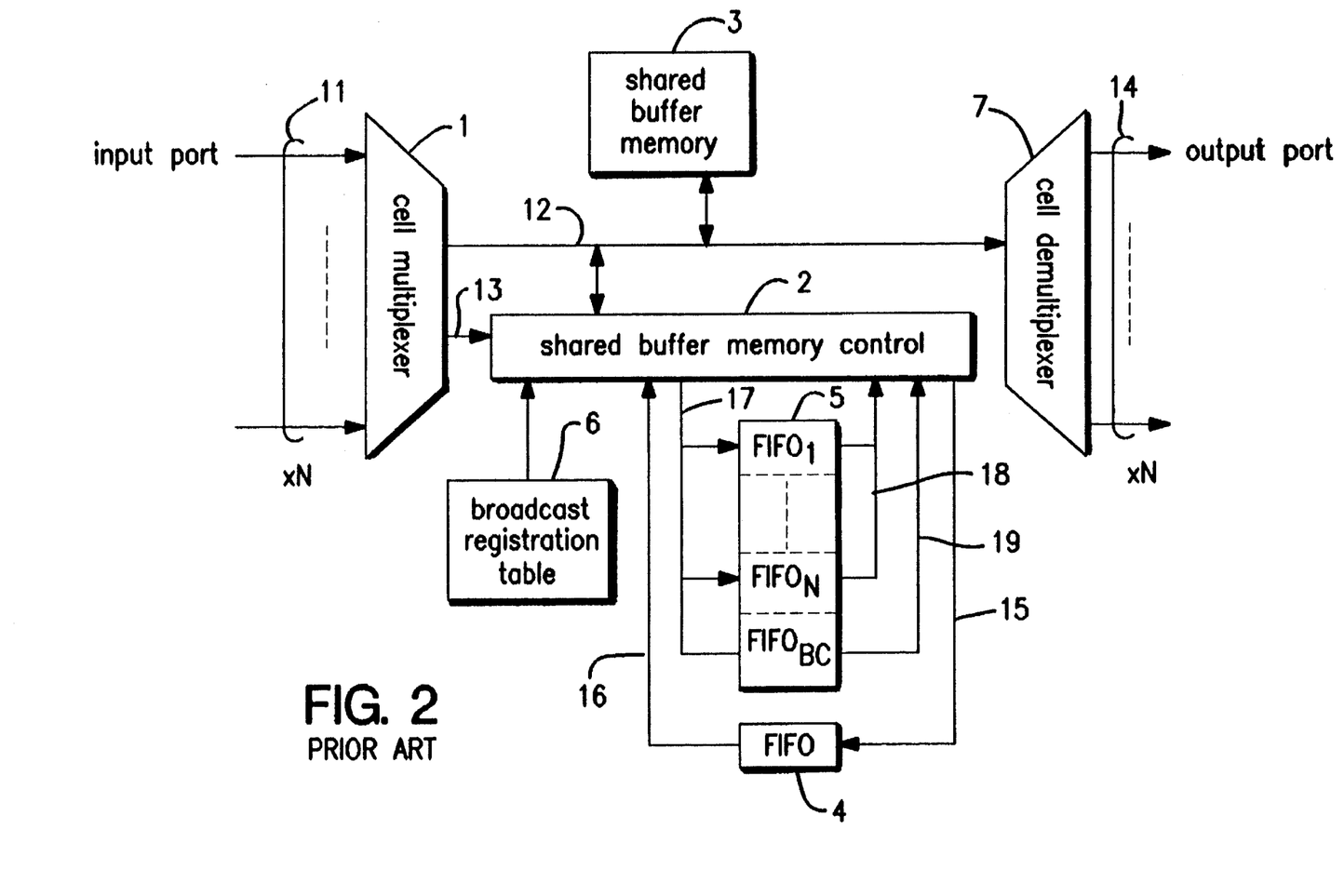
FIG. 2 is a schematic block diagram illustrating a prior art shared buffer memory switch.

As shown in FIG. 2, the shared buffer memory switch has the following functional components;

a shared buffer memory 3 with a large capacity for temporarily storing cells from any of the input ports 11 to any of output ports 14, a cell multiplexer 1 for multiplexing incoming cells through input ports and outputting the multiplexed cells to a time division multiplex data bus 12, and a cell demultiplexer 7 for demultiplexing and distributing the multiplexed cells on the time division multiplex data bus 12 to each of output ports, a shared buffer memory control 2 for controlling the operation of writing cells on the time division multiplex data bus 12 into the shared buffer memory 3 in a writing cycle of the operation, and reading cells in the shared buffer memory 3 out to the time division multiplex data bus 12 in a reading cycle of the operation, a FIFO (first-in-first-out) memory 4 has an address pointer queue for storing and indicating address information of idle area which is available in the shared buffer memory 3, a FIFO memory 5, which is one physical memory divided into several logical queuing memories, has address pointer queues for each of output ports (from No. 1 to No. N) and for a broadcasting operation, by which one cell from an input port is transmitted to a plural number of output ports simultaneously, and each address pointer queue stores and indicates the address information of the shared buffer memory 3 in which the cell to be routed to the output port is stored, simultaneous access to multiple address pointer queues not being available as this memory is a single physical memory, and a broadcast registration table 6 for the broadcasting operation and storing the information of broadcasting destinations in the form of bit map data corresponding to each of output ports.

Figure 3:
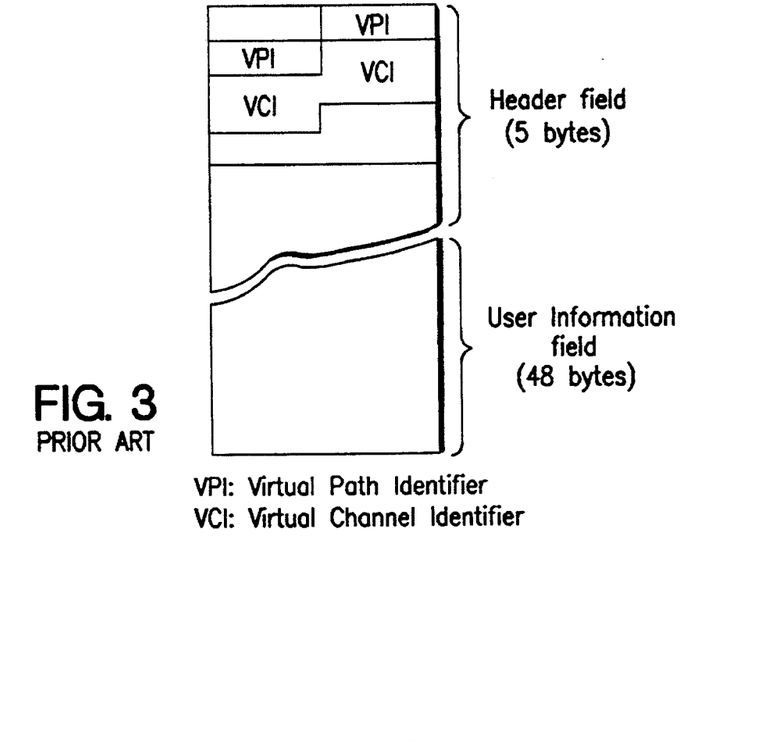
FIG. 3 is a schematic diagram showing an outline of the cell format used for the ATM switching system.

FIG. 3 shows an outline of cell format used for the ATM switching system. Each cell has a header field of 5 bytes and a user information field of 48 bytes, and the header field contains various information for handling this cell for call processing control. Among those information, VPI (Virtual Path Identifier) and VCI (Virtual Channel Identifier) are used as routing information, and are extracted by the cell multiplexer 1. This routing information extracted by the cell multiplexer is supplied to the shared buffer memory control 2 through a routing information path 13.

Figure 4:
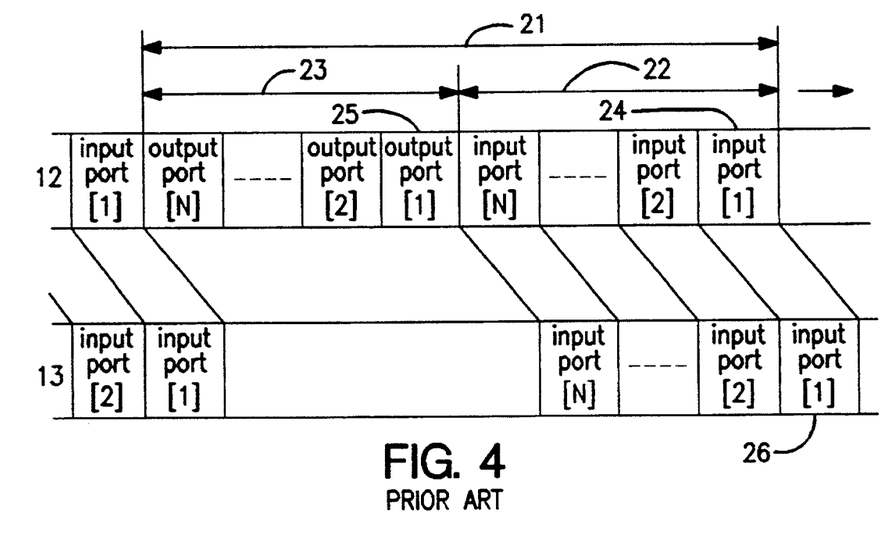
FIG. 4 is a schematic diagram showing a multiframe format in the time division multiplex data bus and related routing information in the routing information path.

The cell multiplexer 1 also multiplexes all cells coming into the switch through each of input ports, and outputs them in a form of frame on the time division multiplex data bus 12 as shown in FIG. 4.

FIG. 4 illustrates a multiframe format on the time division multiplex data bus 12. As shown in this figure, a multiframe 21 is consisted by a cell slot group 22 for cells coming into through the input ports 11 and a cell slot group 23 for cells going out through the output ports 14. Each cell slot in each cell slot group is assigned in correspondence to each input port and each output port, e.g. the cell slot 24 is assigned to a cell from input port No. 1 and the cell slot 25 is assigned to a cell to output port No. 1. FIG. 4 also illustrates a routing information on the routing information path 13. The routing information extracted by the cell multiplexer 1 is put into each slot position which corresponds to each input port, e.g. the slot position 26 contains the routing information for the cell from the input port No. 1.

Figure 5A:
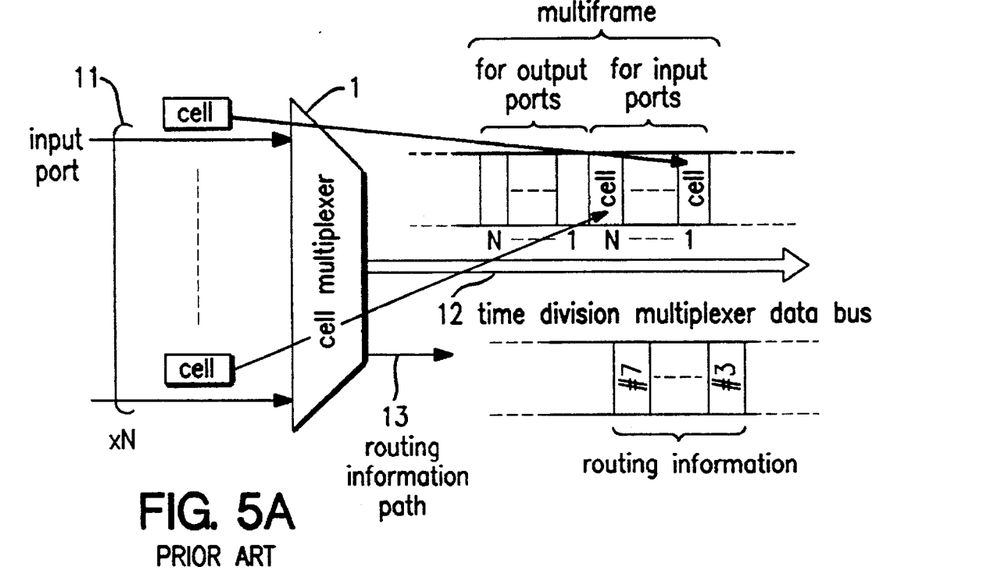
FIGS. 5(a), (b), (c) and (d) are schematic block diagrams showing a writing operation and a reading operation of the shared buffer memory switch.

FIGS. 5(a), (b), (c) and (d) are provided for explaining how the shared buffer memory switch works for switching ordinary cells.

As shown in FIG. 5(a), the cell multiplexer 1 multiplexes all cells coming through input ports 11 and puts each of those cells into each cell slot position for the input port frame on the time division multiplex data bus 12 in correspondence to each input port, and at the same time, the routing information extracted from the header of each cell is transferred through the routing information path 13. The routing information indicates the number of outgoing port for the cell to be routed. As an example, FIG. 5(a) shows No. 3 outgoing port as the routing information for the cell coming through No. 1 input port and No. 7 outgoing port as the routing information for the cell coming through No. N input port.

Figure 5B:
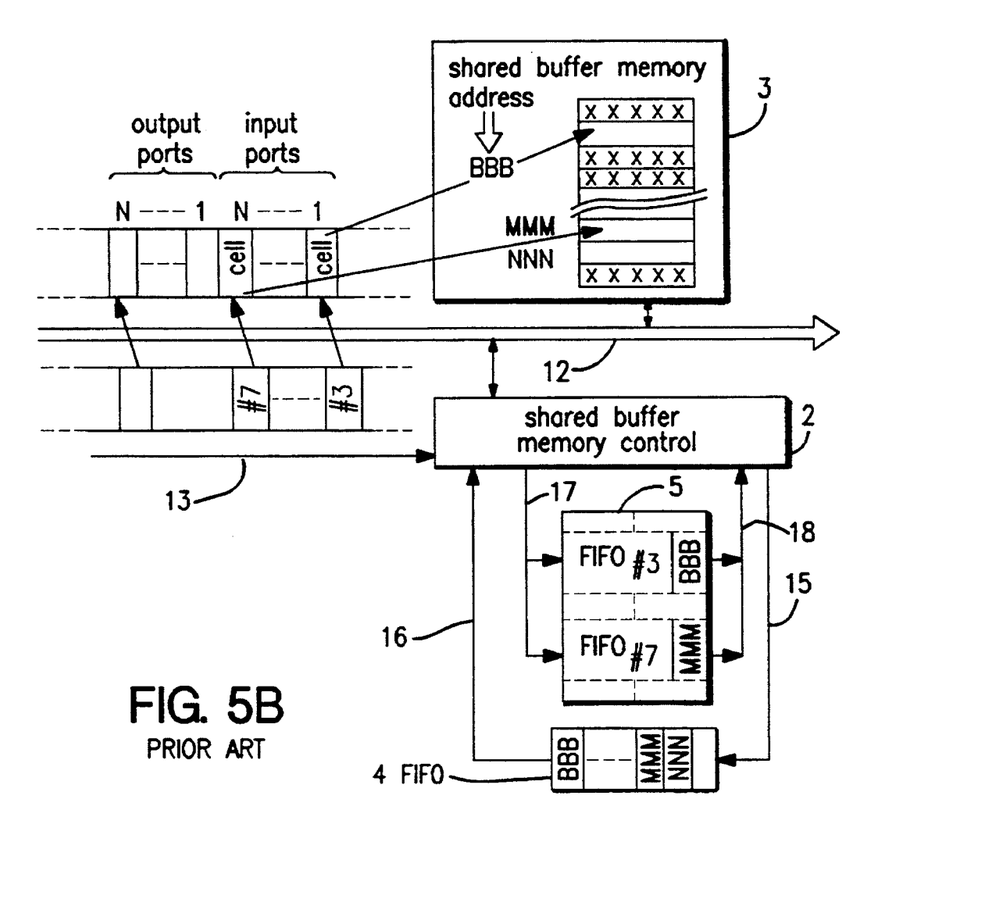

FIG. 5(b) illustrates the writing operation by the shared buffer memory control 2. It is assumed that the idle area of shared buffer memory 3 exists in each address of "BBB", "MMM" and "NNN" (other idle areas between the address "BBB" and the address "MMM" are omitted). The address information of those idle area are stored in the address pointer queue of FIFO 4 through the information path 15.

When the shared buffer memory control 2 receives the routing information corresponding to the No. 1 input port from the cell multiplexer 1 through the routing information path 13, it discriminates the number of outgoing port for the cell to be routed and also it extracts an idle address of the shared buffer memory 3 from the address pointer queue of FIFO 4 through the information path 16 for storing this cell into the shared buffer memory 3. In this example shown in FIG. 5(*b*), the routing destination of the cell from No. 1 input port is to No. 3 output port, and the address "BBB" is extracted for storing the cell being transferred in the cell slot for No. 1 input port on the time division multiplex data bus 12 into the shared buffer memory 3.

Having completed the storage of the cell into the address "BBB" of the shared buffer memory 3, the shared buffer memory control 2 then writes the address information of "BBB" into the address pointer queue of FIFO 5 corresponding to the No. 3 outgoing port through the information path 17.

In this manner, the cell in the cell slot for No. N input port on the time division multiplex data bus 12 is stored in the shared buffer memory with its address of "MMM", and the address information of "MMM" is written in the address pointer queue of FIFO 5 for the No. 7 outgoing port.

Figure 5C:
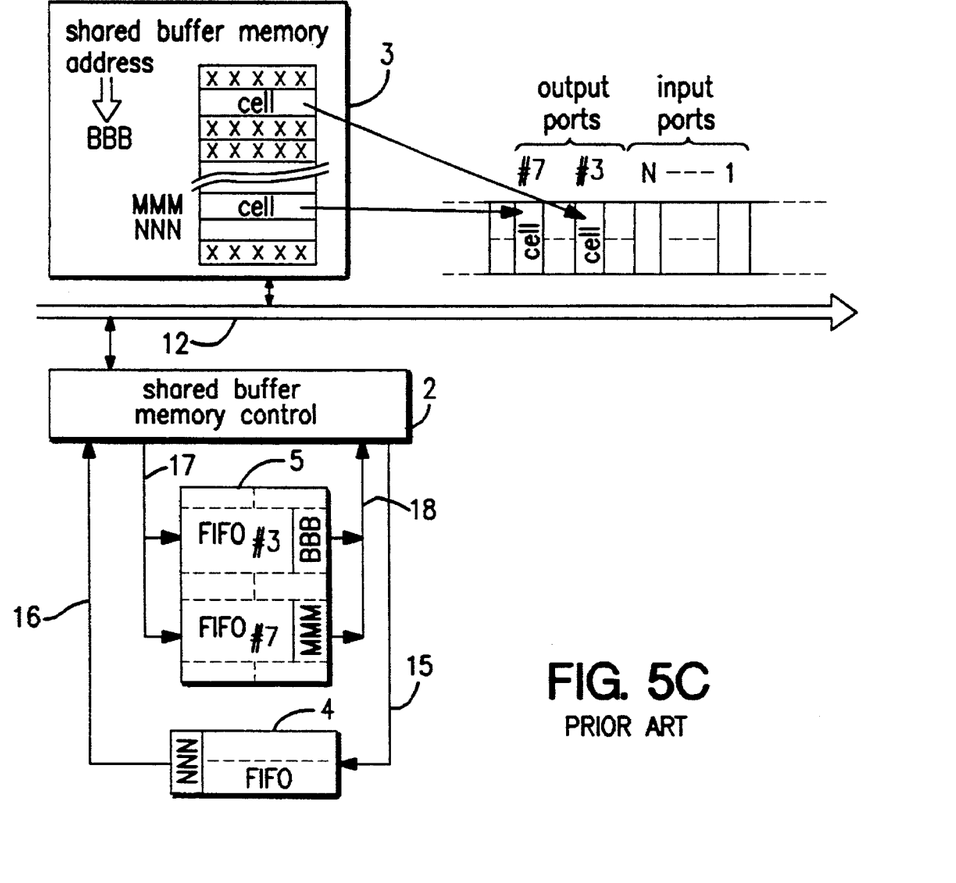
Figure 5D:
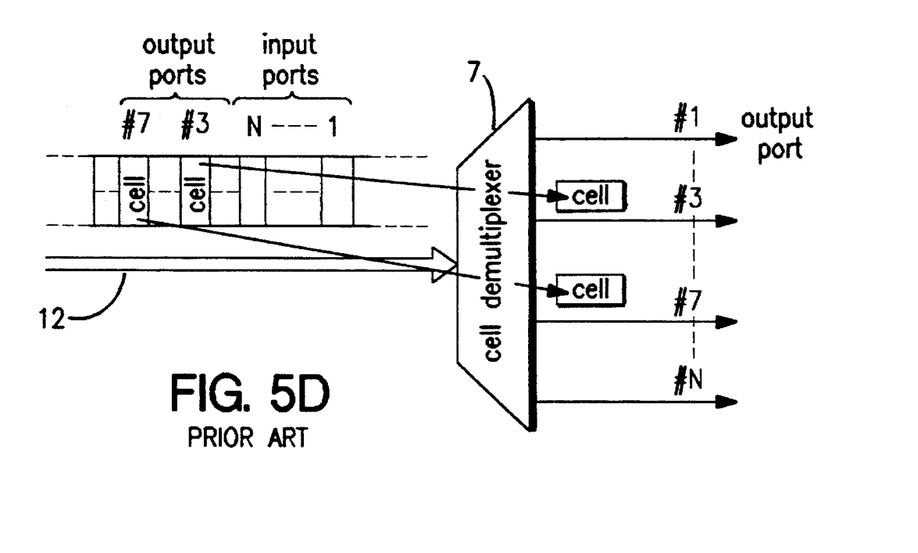

The reading cycle of operation for the shared buffer memory control 2 will be described hereafter by referring to FIG. 5(*c*).

In the reading cycle, the shared buffer memory control 2 reads the address pointer queue of FIFO 5 for each output port one by one through the information path 18. The address information read out from the address pointer queue of FIFO 5 for a specific outgoing port is referred as the address of the shared buffer memory 3 from which the cell being stored is to be read out, and the cell read out from the shared buffer memory 2 is put into the cell slot on the time division multiplex data bus 12 corresponding to the output port.

In the case of an example shown in FIG. 5(*c*), the address information of "BBB" is read out from the address pointer queue of FIFO 5 for the No. 3 outgoing port, the cell in the shared buffer memory 2 with the address "BBB" is read out and then the cell is put into the cell slot on the time division multiplex data bus 12 corresponding to the No. 3 outgoing port. Also, at the time of reading for the address pointer queue of FIFO 5 for the No. 7 output port, the address information of "MMM" is read out, the cell in the shared buffer memory 2 with the address "MMM" is read out and then the cell is put into the cell slot on the time division multiplex data bus 12 corresponding to the No. 7 outgoing port.

The cell in each of cell slots for the output ports on the time division multiplex data bus 12 is transferred to the cell demultiplexer 7 which demultiplexes cells on the time division multiplex data bus 12 and distributes each cell to the corresponding output port.

As explained above, the ordinary cell coming through one of input ports is switched and output through one of output ports. In the case of the broadcasting (or multicasting) operation which is used for a broadcast application, a multiple connection in desktop conference applications, etc., the cell to be broadcasted coming through one of input ports is switched and output to a plural number of output ports simultaneously.

Figure 6:
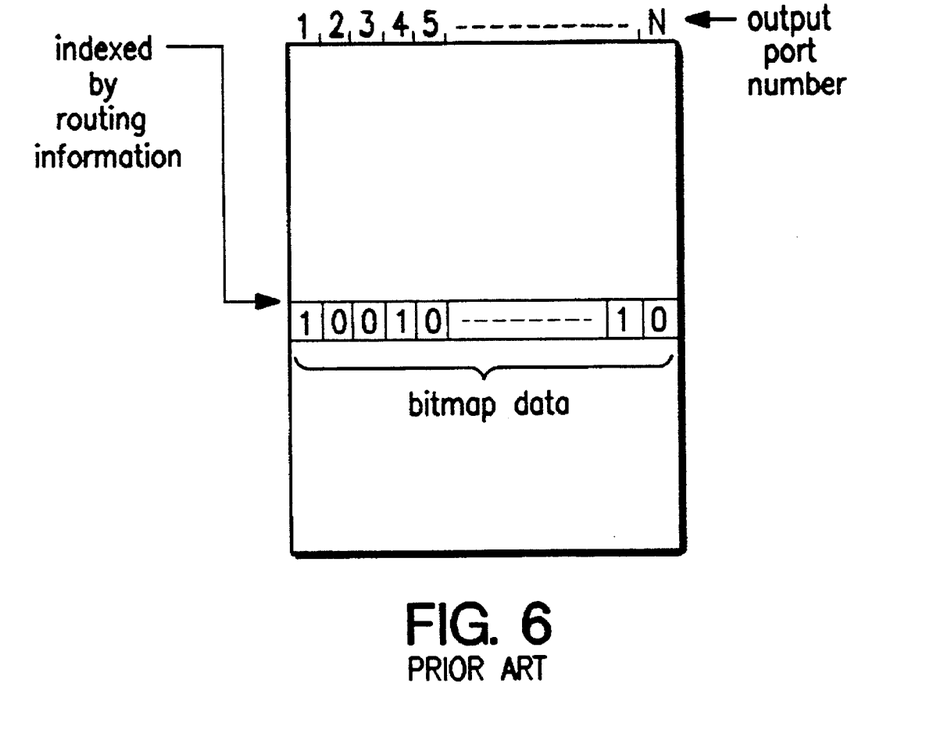
FIG. 6 is a schematic diagram showing an outline of the broadcast registration table.

This broadcasting operation is handled by the address pointer queue for the broadcasting operation shown as FIFO BC of the FIFO memory 5 and the broadcast registration table 6 in FIG. 2, and FIG. 6 shows the outline of the broadcast registration table 6.

The broadcast registration table 6 registers destination output ports for each broadcasting cell in the form of bit map data in which each bit corresponds to each output port, and a bit position set as "1" indicates the destination output port. The bit map data for each broadcasting cell is registered when the connection of the cell is set up and eliminated when the connection of the cell is released. The bit map data for a particular broadcasting cell is indexed and extracted by the routing information based on VPI and VCI in the operation of the shared buffer memory control 2.

The writing operation for the broadcasting cell is similar to that for the ordinary cell, but the reading operation is different. The writing operation and the reading operation for the broadcasting cell will be described in the following with the reference to FIG. 2.

When a broadcasting cell is input through one of input ports, the shared buffer memory control 2 can distinguish that this cell is a broadcasting cell by the routing information transferred from the cell multiplexer 1, and extracts an address of idle area in the shared buffer memory from the FIFO 4 through the information path 16. The shared buffer memory control 2 stores the cell (the broadcasting cell) into the area of the shared buffer memory indicated by the extracted address, and then writes the address into the address pointer queue for the broadcasting control FIFO BC through the information path 17.

In the reading operation for the broadcasting control, the shared buffer memory control 2 reads out the address of the shared buffer memory in which the broadcasting cell is being stored from the address pointer queue FIFO BC through the information path 19. After the broadcasting cell has been read out, the shared buffer memory control 2 then extracts the bit map data corresponding to the cell from the broadcast registration table 6. The shared buffer memory control 2 puts the cell into each cell slot for the output ports in accordance with the bit map data showing the bit positions with "1".

As described above for the conventional shared buffer memory switch and its broadcasting operation, the switch works for the ordinary cells and the broadcasting cells independently, and it is sometimes common for the address pointer queue for the broadcasting cells to have priority in the reading operation and this causes an irregular operation in that the ordinary cell written in the address pointer queue for a specific output port arrived earlier than a broadcasting cell, and is read out later than the broadcasting cell to the same output port. Therefore, the shared buffer memory switch cannot maintain the sequence of outputting cells in the order of arrival of cells, and this causes problems in guarantee of the transfer quality at the same level defined for each connection because ordinary cells and broadcasting cells are output to an output port in a different order even if those cells have the same transfer quality which should guarantee maintaining the sequence of outputting in the order of arrival.

SUMMARY OF THE INVENTION

The present invention solves such problem, and is intended to provide a shared buffer memory switch for an ATM switching system and its broadcasting method which can guarantee the cell transfer quality initially defined for each connection even if ordinary and broadcasting cells are mixed.

To attain such object, the shared buffer memory switch according to the present invention comprises a first address pointer queue of a first-in-first-out memory for storing addresses of idle areas in the shared buffer memory, a plurality of second address pointer queues of a first-in-first-out (FIFO) memory each of which is provided for each of the output ports for storing addresses of storage area in the shared buffer memory in which the cells to be output to the corresponding output port are stored, a broadcast registration table which stores broadcasting destination information for each of broadcasting cells, and a shared buffer memory control.

The shared buffer memory control performs the operation of writing cells from input ports into the shared buffer memory and reading cells from the shared buffer memory to output ports.

In writing a broadcasting cell into the shared buffer memory, the shared buffer memory control reads an address for storing the broadcasting cell from the first address pointer queue, reads a broadcasting destination information of the broadcasting cell from the broadcast registration table based on the routing information derived from an information contained in a header of the broadcasting cell, writes the address into all second address pointer queues whose corresponding output ports are indicated by the broadcasting destination information, and stores the broadcasting cell with the broadcasting destination information into an area of the shared buffer memory indicated by the address.

In reading a broadcasting cell from the shared buffer memory, the shared buffer memory control reads an address from the second address pointer queue corresponding to the output port to which the cell is to be output, reads a cell from the shared buffer memory with the address, outputs the cell to the output port, eliminates a destination information added to the broadcasting cell corresponding to a output port currently being proceeded, and stores the broadcasting cell with the destination information again into the same address in the shared buffer memory.

The shared buffer memory switch according to the present invention further comprises an information checking means for recognizing completion of reading a broadcasting cell stored in the shared buffer memory to all destination output ports indicated in the broadcasting destination information by referring the broadcasting destination information added to the broadcasting cell, and upon recognition of completion of reading the broadcasting cell, making idle the address having been used for storing the broadcasting cell into the shared buffer memory.

In the shared buffer memory switch according to the present invention, the broadcasting destination information forms a bit map data whose each bit position corresponds to each of the output ports.

In addition, the broadcasting control method for the shared buffer memory switch according to the present invention provides a first address pointer queue of a first-in-first-out memory for storing addresses of idle area in the shared buffer memory, a plurality of second address pointer queues of a first-in-first-out memory each of which is provided for each of the output ports for storing addresses of storage area in the shared buffer memory in which the cells to be output to the corresponding output port are stored, a broadcast registration table which stores broadcasting destination information for each of broadcasting cells, and a shared buffer memory control which has the following steps of controlling operation;

In writing a broadcasting cell, reading an address for storing the broadcasting cell into the shared buffer memory from the first address pointer queue, reading a broadcasting destination information of the broadcasting cell from the broadcast registration table based on the routing information derived from an information contained in a header of the broadcasting cell, writing the address into all second address pointer queues whose corresponding output ports are indicated by the broadcasting destination information, and storing the broadcasting cell with the broadcasting destination information into an area of the shared buffer memory indicated by the address.

In reading a broadcasting cell from the shared buffer memory, reading an address from the second address pointer queue, reading a cell from the shared buffer memory with the address, outputting said cell to the output port, eliminating a destination information added to the broadcasting cell corresponding to a output port currently being proceeded, and storing the broadcasting cell again into the same address in the shared buffer memory.

Furthermore, the broadcasting control method for the shared buffer memory switch according to the present invention further provides steps of recognizing completion of reading a broadcasting cell stored in the shared buffer memory to all destination output ports indicated in the broadcasting destination information by referring the broadcasting destination information added to the broadcasting cell, and making an idle the address having been used for storing the broadcasting cell into the shared buffer memory upon recognition of completion of reading the broadcasting cell.

Accordingly, in writing a broadcasting cell into the shared buffer memory, the address storing the cell with the broadcasting destination information is written in all second address pointer queues corresponding to output ports for the broadcasting destination, and it makes possible for reading a same cell for broadcasting to each destination without changing a sequence of arrival for each cell even if ordinary and broadcasting cells are mixed. In reading a broadcasting cell from the shared buffer memory, whenever the cell is read out to each of output ports, the broadcasting destination information corresponding to each output port is reset one by one and the cell with revised broadcasting destination information is stored again into the same address until all broadcasting destination information are reset, and it makes it possible to supply a broadcasting cell to all broadcasting destinations with a simple configuration.

DETAILED DESCRIPTION OF THE PREFERRED EMBODIMENTS

The present invention will be described in the following by referring to the attached drawings.

Figure 7:
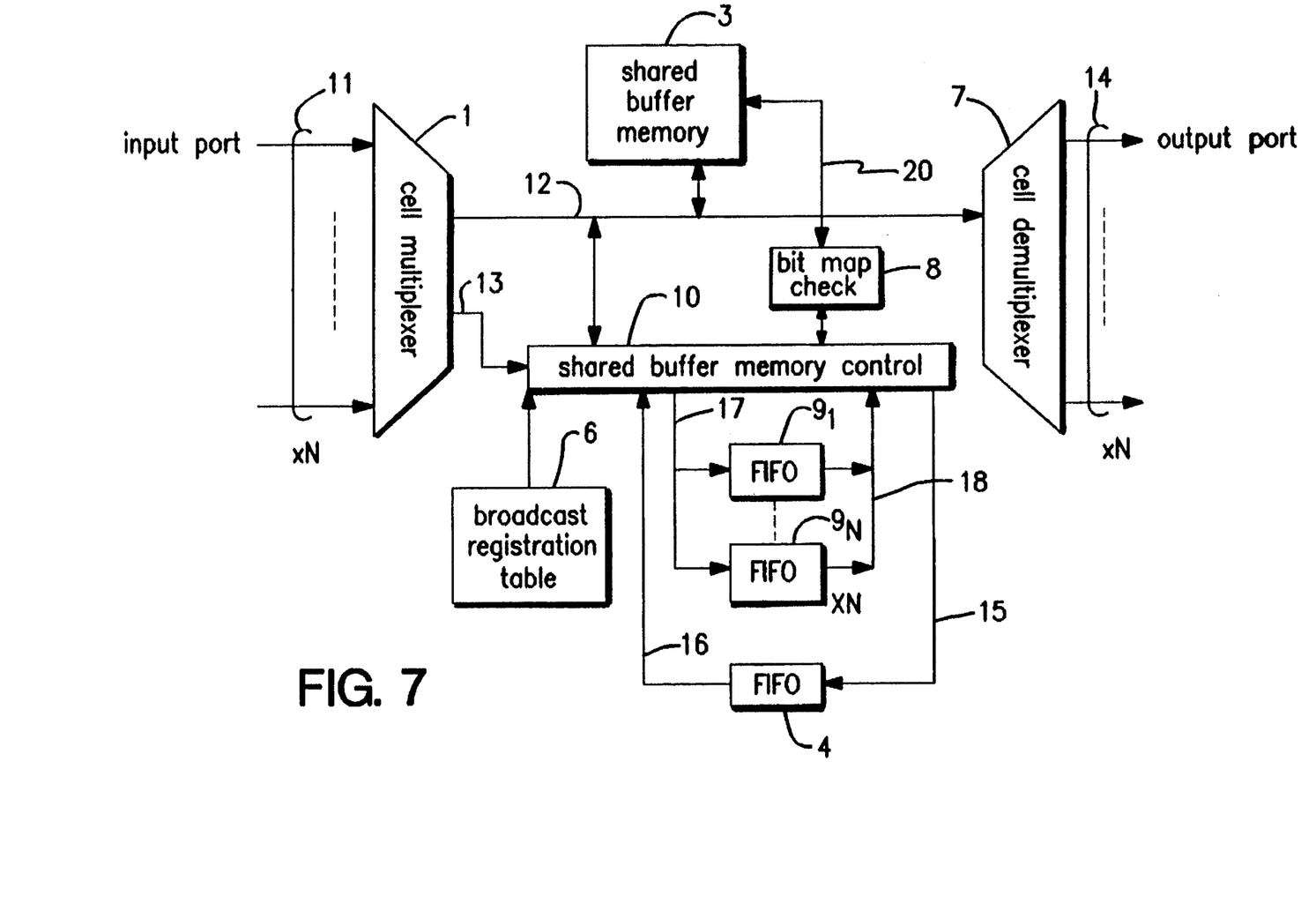
FIG. 7 is a schematic block diagram illustrating a shared buffer memory switch according to the present invention.

FIG. 7 is a block diagram showing an N×N shared buffer memory switch which is an embodiment of the present invention. The functional components which are similar to the prior art shown in FIG. 2 are denoted by the same reference numeral, the shared buffer memory switch according to the present invention has the following functional components:

- a shared buffer memory 3 with a large capacity for temporarily storing cells from any of input ports 11 to any of output ports 14,
- a cell multiplexer 1 for multiplexing incoming cells through input ports and outputting the multiplexed cells to a time division multiplex data bus 12, and a cell demultiplexer 7 for demultiplexing and distributing the multiplexed cells on the time division multiplex data bus 12 to each of output ports,
- a shared buffer memory control 10 for controlling operation of writing cells on a time division multiplex data bus 12 into the shared buffer memory 3 in a writing cycle of the operation, and reading cells in the shared buffer memory 3 out to the time division multiplex data bus 12 in a reading cycle of the operation,
- a FIFO (first-in-first-out) memory 4 as an address pointer queue for storing and indicating address information of idle areas which are available in the shared buffer memory 3,
- a plurality of FIFO memories $9_1$ to $9_N$, each of them corresponding with each of the output ports (from No. 1 to No. N) to be used as an address pointer queue for indicating an address information of the shared buffer memory 3 in which the cell to be routed to the output port has been stored,
- a broadcast registration table 6 for the broadcasting operation and storing the information of broadcasting destinations in the form of bit map data corresponding to each of output ports, and
- a bit map check 8 for checking a bit map data in a cell at the time of broadcasting operation.

Figure 8:
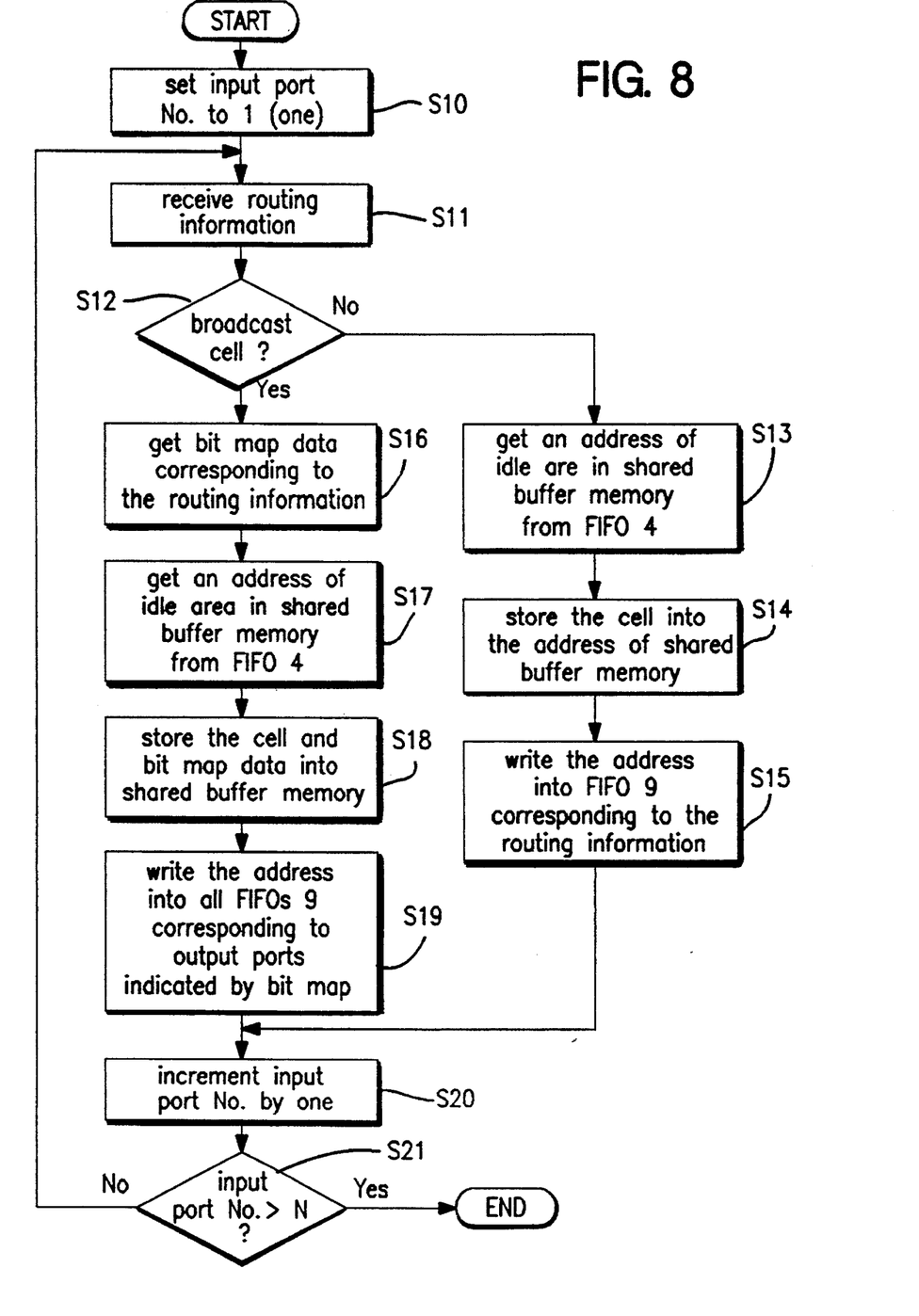
FIG. 8 is a flowchart of a writing operation according to the present invention.
Figure 9:
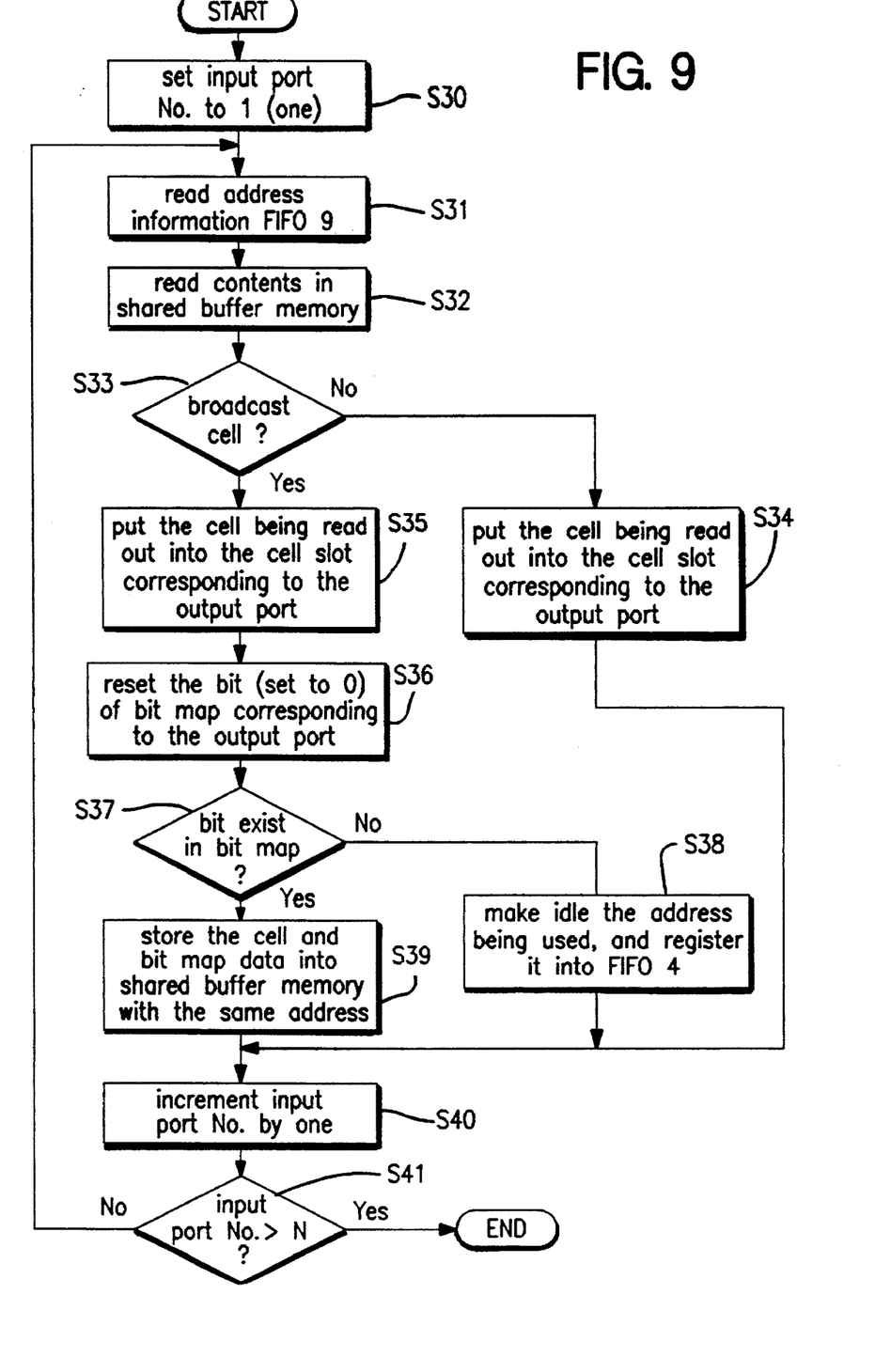
FIG. 9 is a flowchart of a reading operation according to the present invention.
Figure 10A:
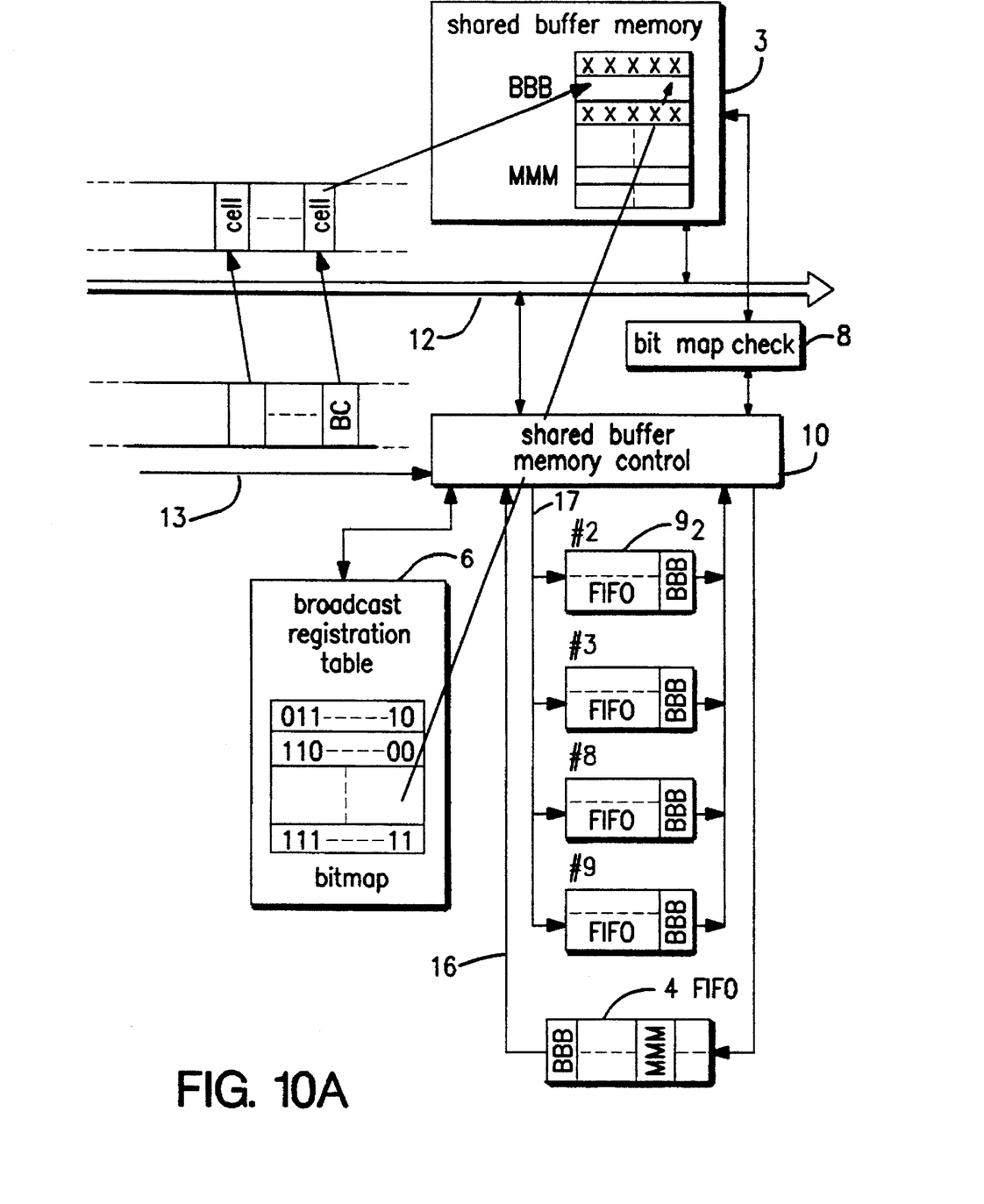
FIGS. 10(a) and (b) are schematic block diagrams illustrating a writing operation for a broadcasting cell according to the present invention.

FIGS. 8 and 9 are flowcharts showing a writing operation and a reading operation of the shared buffer memory switch respectively according to the present invention, and FIGS. 10(a), (b) and 11 are schematic block diagrams illustrating a writing operation and a reading operation respectively for a broadcasting cell according to the present invention. The operation of the present invention will be described with reference to those figures.

First, the operation shown in the flowchart of FIG. 8 for the writing operation will be described.

The cell multiplexer 1 multiplexes cells coming through the input ports 11 and outputs those multiplexed cells to the time division multiplex data bus 12, and at the same time, the routing information which shows the destination of each cell, e.g. output port number to be routed, is transferred to the shared buffer memory control 10 through the routing information path 13. The type of cell, e.g. whether it is an ordinary cell or a broadcasting cell, is also identified by the cell multiplexer 1, and this identified information is added to the cell when it is multiplexed. The VPI and VCI stored in the header of the cell are used for those operation by the cell multiplexer 1.

The shared buffer memory control 10 writes each cell in a cell slot, which has already been described relative to the prior art FIG. 4, on the time division multiplex data bus 12 into the shared buffer memory one by one in accordance with their arrival, and all cells in a cell slot group for the input port are to be written in one cycle of the writing operation. Therefore, it controls the sequential control of writing in accordance with the input port number as shown in the steps S10, S20 and S21 of FIG. 8.

The shared buffer memory control 10 receives the routing information from the cell multiplexer 1 corresponding to the cell on the time division multiplex data bus 12 (the step S11), and also discriminates whether the cell is an ordinary cell or a broadcasting cell based on the information being added to the cell (the step S12).

When the cell is an ordinary cell (the step S12: No), the shared buffer memory control 10 picks up one address information through the information path 16 from the address pointer queue of FIFO 4 which manages addresses of the idle areas available in the shared buffer memory 3 (the step S13), and then stores the cell in a cell slot on the time division multiplex data bus 12 into the area of the shared buffer memory 3 which is indicated by the address information being picked up from the FIFO 4 (the step S14). The address of the shared buffer memory 3 in which the cell being stored is written into the address pointer queue of FIFO 9- corresponding to the output port to which the cell is to be routed through the information path 17 (the step S15).

In the case where the cell is a broadcasting cell (the step S12: Yes), the shared buffer memory control 10 refers to the broadcast registration table 6 and extracts the bit map data which is corresponding to the routing information being received through the routing information path 13 (the step S16).

As shown in FIG. 10(a), the broadcast registration table 6 contains the bit map data for all broadcasting cells, and the bit map data for each of the broadcasting cells is extracted by indexing the table by the routing information of each broadcasting cell. The bit map data indicates all destination for the broadcasting cell by the bit position with "1" corresponding to each output port number.

Figure 10B:
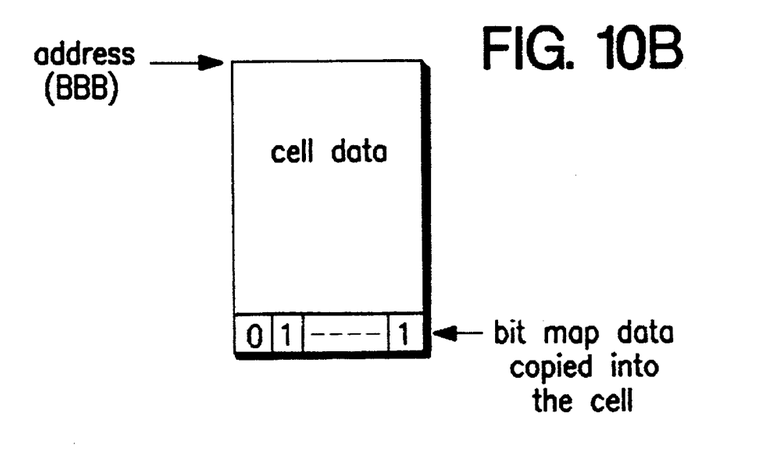

Then, the shared buffer memory control 10 picks up one address information available for storing in the shared buffer memory 3 from the address pointer queue of FIFO 4 (the step S17). The bit map data extracted from the broadcast registration table 6 is copied into the cell as shown in FIG. 10(b), and the shared buffer memory control 10 stores the cell into the area of the shared buffer memory 3 which is indicated by the address information being picked up from the FIFO 4 (the step S18). The address of the shared buffer memory 3 in which the cell being stored is written into all address pointer queues of FIFOs 9-corresponding to each output port indicated by the bit map data for the cell (the step S19). FIG. 10(a) shows an example in which the destinations for broadcasting the cell are to output ports No. 2, No. 3, No. 8 and No. 9.

Next, the operation shown in the flowchart of FIG. 9 for the reading operation will be described.

The shared buffer memory control 10 executes the reading operation in synchronization with each cell slot timing in the cell slot group for the output port on the time division multiplex data bus 12, and a cell being stored in the shared buffer memory 3 is to be read out into the corresponding cell slot one by one for one cell slot group within one cycle of the reading operation. Therefore, it controls the sequential control of reading in accordance with the output port number as shown in the steps S30, S40 and S41.

The shared buffer memory control 10 reads an address information written in the address pointer queue of FIFO 9-corresponding to the output port to which the cell is to be read out, and reads out the cell from the area in the shared buffer memory 3 with the address indicated by the address information being read from the FIFO 9- (the steps S31 and S32).

When the cell read out from the shared buffer memory 3 is an ordinary cell (the step S33: No), the shared buffer memory control 10 puts the cell into the cell slot on the time division multiplex data bus 12 corresponding to the output port (the step S34), and proceeds to read a cell for the next output port.

In the case where the cell read out from the shared buffer memory 3 is a broadcasting cell (the step S33: Yes), the bit map data is simultaneously read out together with the cell. The cell itself is supplied to the cell slot on the time division multiplex data bus 12 corresponding to the output port (the step S36). At this time, the shared buffer memory control 10 copies the cell and resets a bit (set to "0") in the bit map data whose bit position corresponds to the output port currently being processed (the step S36), and stores the cell (copied cell) with the revised bit map data to the same address in the shared buffer memory 3 through the information path 20 via the bit map check 8.

The bit map check 8 confirms whether any bit in the bit map data is still set (to "1"), and it allows the cell with the revised bit map data to be stored in the shared buffer memory 3 if any bit is still set (the step S37: Yes). Having passed the check by the bit map check 8, the cell with the revised bit map data is stored in the same address of the shared buffer memory 3 (the step S39).

As the same address of the shared buffer memory 3, in which the cell to be broadcasted is stored, is being written into all address pointer queues of FIFOs 9- which correspond to the destination output ports for the broadcasting cell, the shared buffer memory control 10 can read and outputs the same cell at the time of reading operation for other output port corresponding to the broadcasting destination, and the bit map data is revised (the bits set to "1" are successively set to "0") one by one whenever the cell for the broadcasting is read out to each destination.

When the cell has been read out to all output ports for the destination of the broadcasting operation, all the bits in the bit map data are reset to "0" at the step S36 of the reading operation for the output port in the last turn of the broadcasting, and the bit map check 8 recognizes it as completion of the broadcasting operation for this cell (the step S38). Then, the bit map check 8 instructs to the shared buffer memory control 10 that the broadcasting operation has been completed for this broadcasting cell, and the address used for storing this broadcasting cell in the shared buffer memory 3 is made idle and registered to the address pointer queue of FIFO 4 for releasing the area in which the broadcasting cell was stored.

Figure 11:
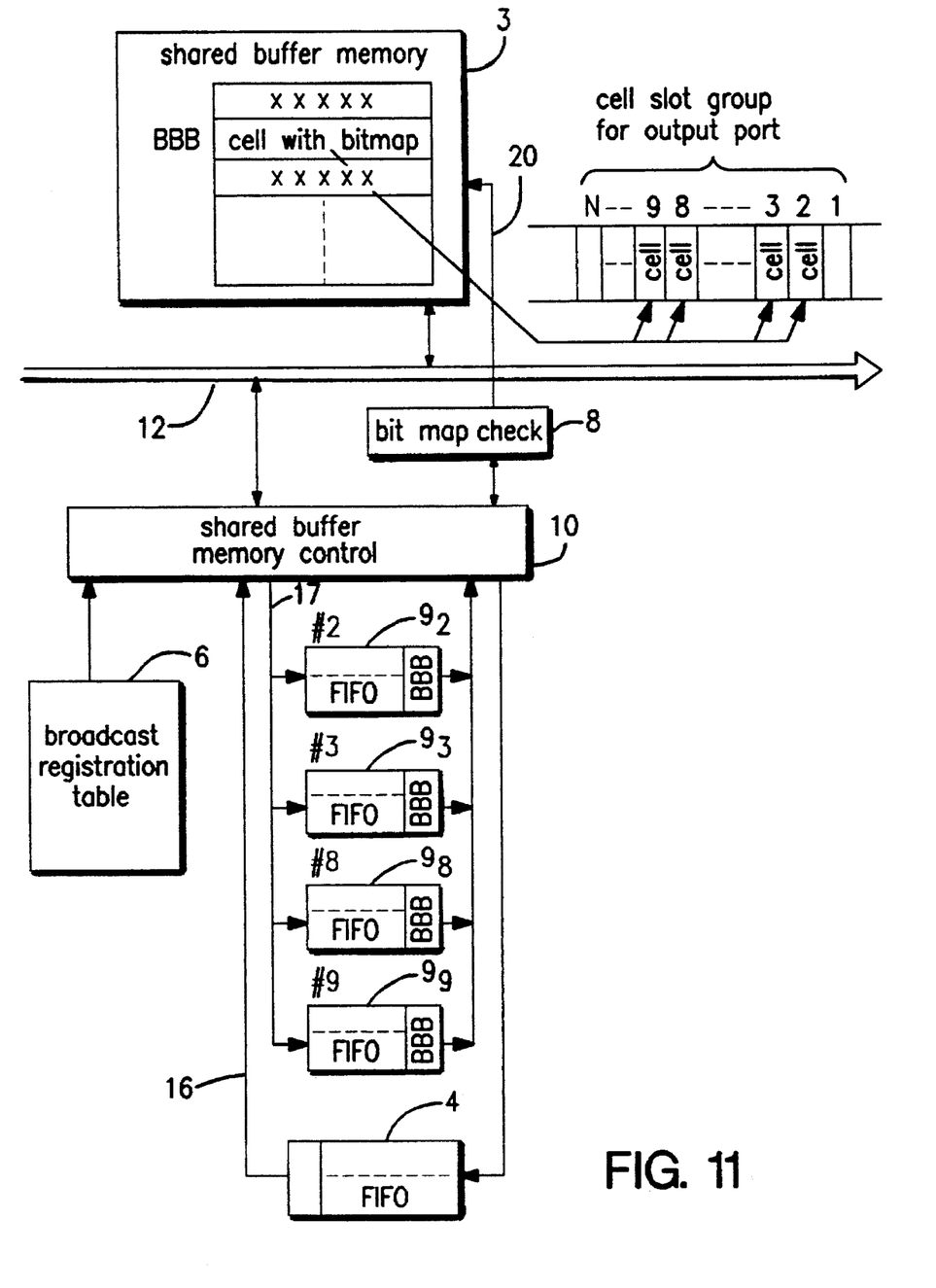
FIG. 11 is a schematic block diagram illustrating a reading operation for a broadcasting cell according to present invention.

FIG. 11 shows an example of this reading operation for the broadcasting cell which is assumed to be routed to output ports No. 2, No. 3, No. 8 and No. 9. The address "BBB" of the shared buffer memory 3 in which the cell with the bit map data is stored is being written into all address pointer queues of FIFOs 9- for the output ports of the broadcasting destination. In each time of the cell slot timing for output ports No. 2, No. 3 and No. 8, the address of "BBB" is read and the cell in the address of "BBB" in the shared buffer memory 3 is read out to the corresponding cell slot on the time division multiplex data bus 12, and also the copied cell with revised bit map data is stored into the same address of the shared buffer memory 3 through bit map check operation by the bit map check 8. At the time of cell slot timing for the output port No. 9, the same operation proceeds for reading out the cell to the cell slot for the output port No. 9 except for storing the cell into the shared buffer memory 3 because all bits of the bit map data are being set to "0", and the address of "BBB" being used for storing the cell is made idle and registered into the address pointer queue of FIFO 4.

Back to FIG. 7, the cell put into the cell slot for the output port on the time division multiplex data bus 12 is transferred to the cell demultiplexer 7, and the cell demultiplexer 7 demultiplexes the cell on the time division multiplex data bus 12 and distributes to each output port 14 corresponding to each cell slot.

As described above, according to the present invention, when the cell coming through the input port 11 is a broadcasting cell, it is arranged that the bit map data is read from the broadcast registration table 6 based on the routing information for the cell from the cell multiplexer 1, and that the address for storing the cell into the shared buffer memory 3 is written into all address pointer queues of FIFOs 9- corresponding to all output ports for which broadcast output is required as indicated by the bit map data. Therefore, there is no need to provide the specific address pointer queue for the broadcasting operation as in the prior art. As the broadcasting cell is also sequentially read out and output in response to the read timing of each cell slot of the output port in the same manner as an ordinary cell, cells are output in the same order as they are input even if the ordinary and broadcasting cells are mixed. Therefore, the cell transfer quality which has originally been defined at the time of set up operation for each connection can be guaranteed.

Furthermore, it is arranged that the bit map data relating to the broadcasting cell is stored in the shared buffer memory 3 together with the cell, and each bit in the bit map data is reset one by one and stored into the shared buffer memory 3 again whenever the read operation for each output port has completed, and completion of the broadcasting operation is recognized by reset of all bits in the bit map data. Thus, the circuit configuration for processing the broadcasting operation is simplified and performed at a high speed.

Although the above description is made on a case where the cell multiplexer 1 performs the discrimination of a cell type whether it is an ordinary cell or a broadcasting cell and the result of the discrimination is added to the cell when it is output to the time division multiplex data bus 12, such a discrimination may be performed by the shared buffer memory control 10. Moreover, the routing information may also be extracted by the shared buffer memory control 10 instead of receiving from the cell multiplexer 1. This makes the configuration of the cell multiplexer 1 simpler so that the processing speed can be improved. Still more, the information contained in the broadcast registration table 6 is not only limited to the bit map data, but other forms of data which show routing destination for each broadcasting cell may be available, and the shared buffer memory control 10 resets the information of each routing destination one by one whenever it completes the reading operation for the output port, and also the bit map check 8 can be altered by other means for recognizing completion of the reading operation of the broadcasting cell or rather it can be a part of the shared buffer memory control 10.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A shared buffer memory switch used for an ATM (Asynchronous Transfer Mode) switching system including a cell multiplexer for multiplexing and outputting incoming cells from a plurality of input ports onto a time division multiplex data bus, a shared buffer memory for storing the cells on said time division multiplex data bus, and a cell demultiplexer for demultiplexing and distributing the cells having been output onto said time division multiplex data bus from said shared buffer memory to a plurality of output ports, said shared buffer memory switch comprising:

a first address pointer queue of a first-in-first-out memory for storing addresses of idle area in said shared buffer memory;

a plurality of second address pointer queues of a first-in-first-out memory, one of said plurality of second address pointer queues being provided for each of said output ports for storing an address of a storage area in said shared buffer memory in which contents of the cell to be output to the corresponding output port are stored;

a broadcast registration table which stores broadcasting destination information corresponding to a routing information of each of broadcasting cells; and a shared buffer memory control for reading a broadcasting destination information from said broadcast registration table corresponding to the routing information of the broadcasting cell when a cell being processed is a broadcasting cell, for reading an address of said shared buffer memory from said first address pointer queue, for writing said address into all said second address pointer queues corresponding to output ports which are indicated by said broadcasting destination information, for writing contents of said broadcasting cell with said broadcasting destination information into an area of said shared buffer memory indicated by said address in a writing cycle, for reading an address from one of said second address pointer queues corresponding to a routing information being processed, and for reading contents of said broadcasting cell with said broadcasting destination information from said shared buffer memory in said address, for copying and outputting said broadcasting cell to said time division multiplex data bus in a reading cycle, for resetting information of destination, corresponding to an output port currently being processed, from said broadcasting destination information, and for writing said broadcasting cell again into the same address in said shared buffer memory with said broadcasting destination information when at least one destination is contained in said broadcasting destination information.

2. A shared buffer memory switch according to claim 1, further comprising:

bit map check means for confirming a state of destination information contained in said broadcasting destination information prior to writing said broadcasting destination information with said broadcasting cell into the same address in said shared buffer memory, and for making idle said address that has been used for writing into said shared buffer memory when said state of destination information indicates that no other destination is left for broadcasting.

3. A shared buffer memory switch according to claim 1 wherein, said broadcasting destination information forms a bit map data whose each bit position corresponds to each of said output ports.

4. A method of controlling a shared buffer memory switch used for an ATM (Asynchronous Transfer Mode) switching system including a cell multiplexer for multiplexing and outputting incoming cells from a plurality of input ports onto a time division multiplex data bus, a shared buffer memory for storing the cells on said time division multiplex data bus, and a cell demultiplexer for demultiplexing and distributing the cells having been output onto said time division multiplex data bus from said shared buffer memory to a plurality of output ports, said shared buffer memory switch further comprising a first address pointer queue of a first-in-first-out memory for storing addresses of idle areas in said shared buffer memory, a plurality of second address pointer queues of a first-in-first-out memory each of which is provided for each of said output ports for storing addresses of storage areas in said shared buffer memory in which the cells to be output to the corresponding output port are stored, a broadcast registration table which stores broadcasting destination information for broadcasting cells, and a shared buffer memory control, said method comprising steps of:

writing each of said broadcasting cells into said shared buffer memory in a writing cycle operation comprising steps of:

reading an address from said first address pointer queue;

reading a broadcasting destination information of the broadcasting cell from said broadcast registration table;

writing said address into all said second address pointer queues corresponding to output ports which are indicated by said broadcasting destination information; and storing said broadcasting cell together with said broadcasting destination information into an area of said shared buffer memory indicated by said address; and reading and outputting each of said broadcasting cells stored in said shared buffer memory in a reading cycle operation comprising steps of:

reading an address from one of said second address pointer queues;

reading a broadcasting cell with a broadcasting destination information from said shared buffer memory in said address;

copying said broadcasting cell;

outputting said broadcasting cell to said time division multiplex data bus;

resetting said broadcasting destination information corresponding to an output port currently being proceeded; and storing said broadcasting cell again into the same address in said shared buffer memory with said broadcasting information.

5. A method of controlling a shared buffer memory switch according to claim 4, further comprising steps of:

recognizing completion of reading a broadcasting cell stored in said shared buffer memory to all destination output ports indicated in said broadcasting destination information, comprising steps of:

confirming a reset status of all of said broadcasting destination information added to said broadcasting cell; and making idle said address having been used for storing said broadcasting cell into said shared buffer memory, when said reset status of all of said broadcasting destination information has been confirmed.

* * * * *